(12) United States Patent
Vanapalli Venkata et al.

(10) Patent No.: US 12,525,047 B2
(45) Date of Patent: Jan. 13, 2026

(54) METHOD AND SYSTEM OF CLASSIFYING TEXT DATA IN A DOCUMENT

(71) Applicant: L&T TECHNOLOGY SERVICES LIMITED, Chennai (IN)

(72) Inventors: Nirmal Ramesh Rayulu Vanapalli Venkata, Visakhapatnam (IN); Irfanali Jamaluddin Shaikh, Thane (IN); Mohammad Zakir Hussaian, Warangal (IN); Madhusudan Singh, Bangalore (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 327 days.

(21) Appl. No.: 18/239,777

(22) Filed: Aug. 30, 2023

(65) Prior Publication Data

US 2024/0355135 A1 Oct. 24, 2024

(30) Foreign Application Priority Data

Apr. 20, 2023 (IN) .............................. 202341028820

(51) Int. Cl.
G06V 30/413 (2022.01)
(52) U.S. Cl.
CPC .................................. *G06V 30/413* (2022.01)
(58) Field of Classification Search
USPC ....................................................... 382/161
See application file for complete search history.

(56) References Cited

U.S. PATENT DOCUMENTS

| | | | |
|---|---|---|---|
| 10,789,302 B2 | 9/2020 | Tripathi et al. | |
| 11,106,716 B2 | 8/2021 | Bhowan et al. | |
| 11,514,238 B2 | 11/2022 | Begun et al. | |
| 11,580,763 B2 | 2/2023 | Ammar et al. | |
| 2020/0081911 A1* | 3/2020 | Vallabhajosyula | G06N 20/00 |
| 2022/0067365 A1 | 3/2022 | Agrawal et al. | |
| 2022/0076109 A1 | 3/2022 | Srivastava et al. | |
| 2022/0405503 A1 | 12/2022 | Kaza et al. | |

FOREIGN PATENT DOCUMENTS

CN 114428855 A 5/2022

* cited by examiner

*Primary Examiner* — Jacky X Zheng
(74) *Attorney, Agent, or Firm* — Kendal M. Sheets

(57) ABSTRACT

A method and system for classifying text data in a document based on hierarchy classification is disclosed. A plurality of line regions comprising text data in the document are determined. Positional information and text-characteristic information for each of the plurality of the line regions is determined. For each of the plurality of line regions, a first hierarchy classification from the plurality of hierarchy classifications based on a plurality of predefined rules is determined and a second hierarchy classification from the plurality of hierarchy classifications and a respective probability value based on a machine learning technique is determined. Each of the plurality of line regions are classified based on the first hierarchy classification or the second hierarchy classification. The second hierarchy classification is selected in case the respective probability value of the second hierarchy classification is greater than equal to a predefined threshold.

20 Claims, 9 Drawing Sheets

300A

ES-MA-67-\*

ENGINEERING SPECIFICATION - MATERIAL

| SUBJECT: ALLOY 925 (UNS N09925) | REVISION CODE: REV. J |
| --- | --- |
| | NO. OF PAGES: 15 |
| ORIGINATED BY: | APPROVED BY: |

NOTICE: THE SPECIFICATIONS AND/OR STANDARDS CONTAINED HEREIN ARE THE PROPERTY OF LTS. THESE SPECIFICATIONS ARE NOT TO BE COPIED OR USED WITHOUT THE AUTHORIZATION OF LTS AND ARE LOANED SUBJECT TO RETURN UPON LTS'S DEMAND.

1. SCOPE:

1.1 This specification defines the purchasing requirements for age - hardenable Alloy 925 (UNS N09925) rod, bar, and seamless tube or pipe.

2. REFERENCE DOCUMENTS:

The latest revision of the following documents shall apply to the extent specified as on Bill of Material (BOM). For dated references, only the edition cited applies. Where industry standards are referenced, the vendor is responsible for obtaining the documents. Where other Lts specifications are referenced, the vendor is responsible for obtaining the documents from Lts.

2.1 API 6A, Wellhead and Christmas Tree Equipment 2.2 API 6ACRA, Age-hardened Nickel-based Alloys for Oil and Gas Drilling and Production Equipment 2.3 ASTM A370, Standard Test Methods and Definitions for Mechanical Testing of Steel Products 2.4 ASTM A604, Standard Practice for Macroetch Testing of Consumable Electrode Remelted Steel Bars and Billets 2.5 ASTM B880, Standard Specification for General Requirements for Chemical Check Analysis Limits for Nickel 2.6 ASTM E10, Standard Test Method for Brinell Hardness of Metallic Materials 2.7 ASTM E29, Standard Practice for Using Significant Digits in Test Data to Determine Conformance with Specifications

FIG. 3A

| x1 | y1 | x2 | y2 | x2-x1 | y2-y1 | Content | Font size | Bold | Italic | Underline | No of wor | Capital | Lower | Camel | Mixed | predicted | Prob_score | rule |
|---|---|---|---|---|---|---|---|---|---|---|---|---|---|---|---|---|---|---|
| 49.675 | 650.053 | 497.256 | 741.102 | 447.581 | 91.049 | L&T Tech | 10.4 | 0 | 0 | 0 | 13 | 0 | 0 | 0 | 1 | 0 H | 0.8 | P |
| 418.15 | 648.453 | 503.056 | 691.254 | 84.9056 | 42.801 | REVISION | 10.4 | 1 | -1 | 0 | 7 | 1 | 0 | 0 | 0 | 0 H | 1 | P |
| 54.475 | 634.823 | 141.98 | 660.804 | 87.505 | 25.981 | ORIGINAT | 12.025 | 1 | -1 | 0 | 3 | 1 | 0 | 0 | 0 | 0 P | 0.64 | P |
| 306.8 | 599.603 | 388.7 | 640.804 | 81.9 | 41.201 | APPROVED | 10.4 | 1 | -1 | 0 | 4 | 1 | 0 | 0 | 0 | 0 H | 0.72 | P |
| 54.475 | 588.754 | 535.287 | 599.154 | 480.812 | 10.4 | NOTICE : | 6.4 | 1 | -1 | 0 | 20 | 0 | 1 | 0 | 0 | 0 H | 0.86 | P |
| 90.525 | 581.203 | 423.556 | 593.228 | 333.031 | 12.025 | USED WIT | 6.4 | 1 | -1 | 0 | 17 | 1 | 0 | 0 | 0 | 0 H | 0.81 | P |
| 511.07 | 646.053 | 528.486 | 658.078 | 17.4163 | 12.025 | 18 | 12.025 | 1 | -1 | 0 | 1 | 1 | 0 | 0 | 0 | 1 P | 0.98 | P |
| 36.05 | 537.953 | 48.193 | 530.05 | 12.143 | 12.0871 | 1 | 12.025 | 1 | -1 | 0 | 1 | 1 | 0 | 0 | 0 | 1 P | 0.99 | P |
| 76.9 | 537.953 | 123.956 | 549.978 | 47.0562 | 12.025 | SCOPE: | 12.025 | 1 | 1 | 0 | 1 | 1 | 0 | 0 | 0 | 0 H | 0.78 | H |
| 90.525 | 512.323 | 109.093 | 524.42 | 18.568 | 12.0871 | 1.1 | 12.025 | 1 | -1 | 0 | 1 | 0 | 1 | 0 | 0 | 1 P | 0.98 | P |
| 90.525 | 468.073 | 109.093 | 481.17 | 18.568 | 12.0972 | 1.2 | 12.025 | 1 | -1 | 0 | 1 | 0 | 1 | 0 | 0 | 1 P | 0.98 | P |
| 126.57 | 397.803 | 544.503 | 524.348 | 417.933 | 126.545 | This speci | 12.025 | 1 | -1 | 0 | 74 | 0 | 1 | 0 | 0 | 0 P | 0.86 | P |
| 36.05 | 371.373 | 48.193 | 383.47 | 12.143 | 12.0972 | 2 | 12.025 | 1 | -1 | 0 | 1 | 1 | 0 | 0 | 0 | 1 P | 0.98 | P |
| 76.9 | 371.373 | 232.906 | 383.398 | 156.006 | 12.025 | REFEREN | 12.025 | 1 | 1 | 0 | 2 | 1 | 0 | 0 | 0 | 0 H | 0.96 | H |
| 90.525 | 298.503 | 530.186 | 352.978 | 459.681 | 54.475 | The latest | 12.025 | 1 | -1 | 0 | 53 | 0 | 1 | 0 | 0 | 0 P | 0.85 | P |
| 90.525 | 272.873 | 109.093 | 284.97 | 18.568 | 12.0972 | 2.1 | 12.025 | 1 | -1 | 0 | 1 | 0 | 1 | 0 | 0 | 1 P | 0.99 | P |
| 126.57 | 272.873 | 381.106 | 284.898 | 254.536 | 12.025 | ES-H-38-* | 12.025 | 1 | -1 | 0 | 7 | 0 | 0 | 0 | 1 | 0 P | 0.66 | P |
| 90.525 | 246.453 | 109.093 | 258.55 | 18.568 | 12.0972 | 2.2 | 12.025 | 1 | -1 | 0 | 1 | 0 | 1 | 0 | 0 | 1 P | 0.99 | P |
| 126.57 | 246.453 | 337.836 | 258.478 | 211.266 | 12.025 | ES-L-125-1 | 12.025 | 1 | -1 | 0 | 4 | 0 | 0 | 0 | 1 | 0.5 H | 0.89 | P |
| 90.525 | 220.823 | 109.093 | 232.92 | 18.568 | 12.0972 | 2.3 | 12.025 | 1 | -1 | 0 | 1 | 0 | 1 | 0 | 0 | 1 P | 0.99 | P |

FIG. 3C

| x1 | y1 | x2 | y2 | x2-x1 | y2-y1 | Content | Font size | Bold | Italic | Underline | No of wor | Capital | Lower | Camel | Mixed | predicted | Prob_score |
|---|---|---|---|---|---|---|---|---|---|---|---|---|---|---|---|---|---|
| 49.675 | 650.053 | 497.256 | 741.102 | 447.581 | 91.049 | I&T Techr | 10.4 | 0 | 0 | 0 | 13 | 0 | 0 | 1 | 0 H | 0.8 |
| 418.15 | 648.453 | 503.056 | 691.254 | 84.9056 | 42.801 | REVISION | 10.4 | -1 | 0 | 0 | 7 | 1 | 0 | 0 | 1 H | 1 |
| 54.475 | 614.823 | 141.98 | 640.804 | 87.505 | 25.981 | ORIGINAT | 12.025 | -1 | 0 | 0 | 3 | 1 | 0 | 0 | 0 P | 0.64 |
| 306.8 | 599.603 | 388.7 | 640.804 | 81.9 | 41.201 | APPROVEI | 10.4 | -1 | 0 | 0 | 4 | 1 | 0 | 0 | 0 P | 0.72 |
| 54.475 | 588.754 | 535.287 | 599.154 | 480.812 | 10.4 | NOTICE: | 6.4 | -1 | 0 | 0 | 20 | 1 | 0 | 0 | 0 H | 0.86 |
| 90.525 | 581.203 | 423.556 | 593.228 | 333.031 | 12.025 | USED WIT | 6.4 | -1 | 0 | 0 | 17 | 1 | 0 | 0 | 0 H | 0.81 |
| 511.07 | 646.053 | 528.486 | 658.078 | 17.4163 | 12.025 | 18 | 12.025 | -1 | 0 | 0 | 1 | 0 | 1 | 0 | 1 P | 0.98 |
| 36.05 | 537.953 | 48.193 | 550.05 | 12.143 | 12.0971 | 1 | 12.025 | -1 | 0 | 0 | 1 | 0 | 1 | 0 | 1 P | 0.99 |
| 76.9 | 537.953 | 123.956 | 549.978 | 47.0562 | 12.025 | SCOPE: | 12.025 | 1 | 0 | 0 | 1 | 1 | 0 | 0 | 0 H | 0.78 |
| 90.525 | 512.323 | 109.093 | 524.42 | 18.568 | 12.0971 | 1.1 | 12.025 | -1 | 0 | 0 | 1 | 0 | 1 | 0 | 1 P | 0.96 |
| 90.525 | 469.073 | 109.093 | 481.17 | 18.568 | 12.0972 | 1.2 | 12.025 | -1 | 0 | 0 | 1 | 0 | 1 | 0 | 1 P | 0.98 |
| 126.57 | 397.803 | 544.503 | 524.348 | 417.933 | 126.545 | This speci | 12.025 | -1 | 0 | 0 | 74 | 0 | 0 | 1 | 0 P | 0.86 |
| 36.05 | 371.373 | 48.193 | 383.47 | 12.143 | 12.0972 | 2 | 12.025 | -1 | 0 | 0 | 1 | 0 | 1 | 0 | 1 P | 0.98 |
| 76.9 | 371.373 | 232.906 | 383.398 | 156.006 | 12.025 | REFERENC | 12.025 | 1 | 0 | 0 | 2 | 1 | 0 | 0 | 0 H | 0.96 |
| 90.525 | 298.503 | 550.106 | 352.978 | 459.581 | 54.475 | The latest | 12.025 | -1 | 0 | 0 | 53 | 0 | 1 | 0 | 0 P | 0.85 |
| 90.525 | 272.873 | 109.093 | 284.97 | 18.568 | 12.0972 | 2.1 | 12.025 | -1 | 0 | 0 | 1 | 0 | 1 | 0 | 1 P | 0.99 |
| 126.57 | 272.873 | 381.106 | 284.898 | 254.536 | 12.025 | ES-H-38-* | 12.025 | -1 | 0 | 0 | 7 | 1 | 0 | 0 | 0 SH | 0.66 |
| 90.525 | 246.453 | 109.093 | 258.55 | 18.568 | 12.0972 | 2.2 | 12.025 | -1 | 0 | 0 | 1 | 0 | 1 | 0 | 1 P | 0.99 |
| 126.57 | 246.453 | 337.836 | 258.478 | 211.266 | 12.025 | ES-H-125 F | 12.025 | -1 | 0 | 0 | 4 | 1 | 0 | 0 | 0 SH | 0.89 |
| 90.525 | 220.823 | 109.093 | 232.92 | 18.568 | 12.0972 | 2.3 | 12.025 | -1 | 0 | 0 | 1 | 0 | 1 | 0 | 1 P | 0.99 |

METHOD AND SYSTEM OF CLASSIFYING TEXT DATA IN A DOCUMENT

TECHNICAL FIELD

This disclosure relates generally to data extraction, and more particularly to a method and a system of classifying text data in a document.

BACKGROUND

Text extraction techniques have assumed importance lately. For example, extraction techniques, such as selectable documents may allow a user to extract text data from a file, such as a Portable Document Format (PDF) file. Further, it may be desirable to extract relevant information and generate expressions using the extracted relevant information.

Data extraction from PDF documents is an error-prone and time-consuming process. Further, data extraction methodologies assist in extraction of text, however, they fail to extract data in correct hierarchical format from various kinds of documents with comparable accuracy as compared to manual extraction.

Therefore, there is a requirement to extract data accurately in selectable document types with hierarchy categorization of the document.

SUMMARY OF THE INVENTION

In an embodiment, a method of classification of text data in a document is disclosed. The method may include determining by a processor, a plurality of line regions in the document. In an embodiment each of the plurality of line regions comprises text data. The method may also include determining positional information and text-characteristic information for each of the plurality of line regions. Further, the method may include for each of the plurality of line regions, determining a first hierarchy classification from a plurality of hierarchy classification based on a plurality of predefined rules and determining a second hierarchy classification from the plurality of hierarchy classifications and a respective probability value based on a machine learning technique. In an embodiment the machine learning technique may be trained based on training data corresponding to a plurality of features of each of the plurality of hierarchy classifications. Further, each of the plurality of line regions may be classified based on the first hierarchy classification or the second hierarchy classification. In an embodiment, the second hierarchy classification may be selected in case the respective probability value of the second hierarchy classification may be greater than or equal to a predefined threshold. In an embodiment, the first hierarchy classification may be selected in case the respective probability value of the second hierarchy classification may less than the predefined threshold.

In another embodiment, a system of classification of text data in a document is disclosed. The system may include a processor, a memory communicatively coupled to the processor, causing the processor to determine a plurality of line regions in the document. In an embodiment each of the plurality of line regions comprises text data. Further, the processor may determine positional information and text-characteristic information for each of the plurality of line regions. Further, for each of the plurality of line regions, the processor may determine a first hierarchy classification from a plurality of hierarchy classification based on a plurality of predefined rules and determine a second hierarchy classification from the plurality of hierarchy classifications and a respective probability value based on a machine learning technique. In an embodiment the machine learning technique may be trained based on training data corresponding to a plurality of features of each of the plurality of hierarchy classifications. Further, each of the plurality of line regions may be classified based on the first hierarchy classification or the second hierarchy classification. In an embodiment, the second hierarchy classification may be selected in case the respective probability value of the second hierarchy classification may be greater than or equal to a predefined threshold. In an embodiment, the first hierarchy classification may be selected in case the respective probability value of the second hierarchy classification may less than the predefined threshold.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3A illustrates an exemplary input document for classification of text data of line regions based on hierarchy classification, in accordance with an embodiment of the present disclosure.

FIG. 3C depicts a table including various features utilized by the rule based module, in accordance with an embodiment of the present disclosure.

FIG. 3E depicts a table including various features utilized by the ML based module, in accordance with an embodiment of the present disclosure.

FIG. 3F depicts a table depicting final hierarchy classification of each line region, in accordance with an embodiment of the present disclosure.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered exemplary only, with the true scope being indicated by the following claims. Additional illustrative embodiments are listed.

Categorizing of text data in a document may enable extraction of relevant text data easily by converting the document into machine-readable format. The hierarchical structure of documents assumes a significant part in understanding the connections between its sections. Headings, in any case, are typically separated from 'ordinary' text in a document and gives an implicit structure discernible by a human reader. The present disclosure provides assistance to any information retrieval system which handles selectable document types, by categorizing the text data of the document based on various hierarchy classifications to simplify the extraction of relevant data from the document.

Figure 1:
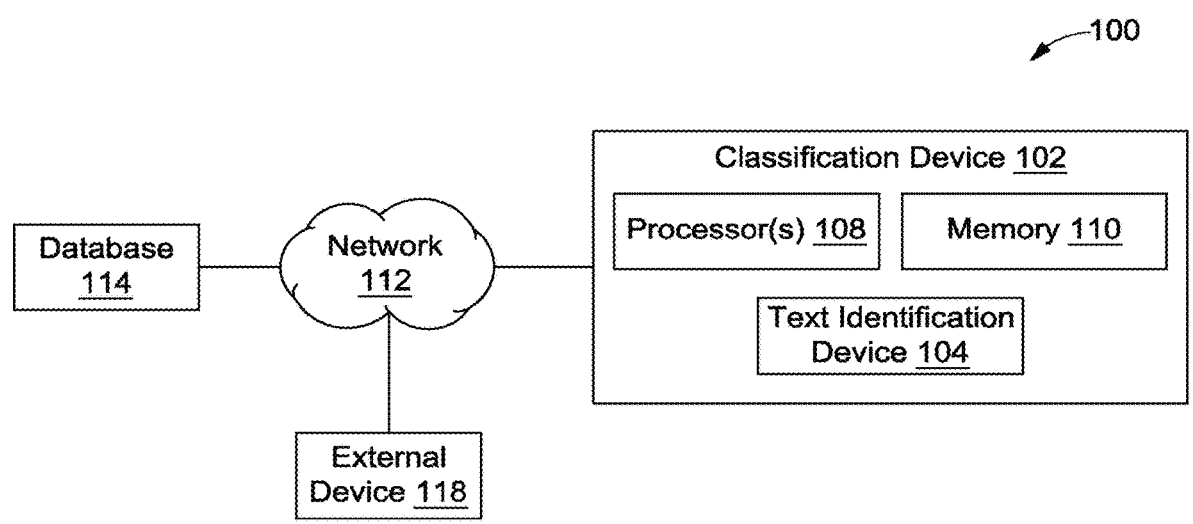
FIG. 1 is functional block diagram of an exemplary text classification system 100 for classifying text data in a document, in accordance with some embodiments of the present disclosure.

Referring now to FIG. 1, a functional block diagram of an exemplary text classification system 100 for classifying text data in a document is illustrated, in accordance with some embodiments of the present disclosure.

The text classification system 100 may include a classification device 102, external device 118 and a database 114 communicably coupled to each other through a wired or a wireless communication network 112. In an embodiment, the database 114 may be enabled in a cloud or a physical database comprising one or more documents which may be converted by an extraction tool to comprise selectable text data for extraction. In an embodiment, database 114 may store data inputted by an external device 118 or generated by the classification device 102.

In an embodiment, the communication network 112 may be a wired or a wireless network or a combination thereof. The network 112 can be implemented as one of the different types of networks, such as but not limited to, ethernetIP network, intranet, local area network (LAN), wide area network (WAN), the internet, Wi-Fi, LTE network, CDMA network, and the like. Further, the network 112 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 112 can include a variety of network devices, including routers, bridges, servers, computing devices, storage devices, and the like.

In an embodiment, the classification device 102 may receive a request for text or data extraction from the external device 118 through the network 112. In an embodiment, external device 118 may be a variety of computing systems, including but not limited to, a smart phone, a laptop computer, a desktop computer, a notebook, a workstation, a portable computer, a personal digital assistant, a handheld, a scanner, or a mobile device. In an embodiment, the classification device 102 may be, but not limited to, in-built into the external device 118.

By way of an example, the classification device 102 may include a text identification device 104. In some embodiments, the text identification device 104 may determine a plurality of line regions in the document including text data. The classification device 102 may include one or more processor(s) 108 and a memory 110. In an embodiment, examples of processor(s) 108 may include, but are not limited to, an Intel® Itanium® or Itanium 2 processor(s), or AMD® Opteron® or Athlon MP® processor(s), Motorola® lines of processors, Nvidia®, FortiSOC™ system on a chip processors or other future processors. The memory 110 may store instructions that, when executed by the processor 108, cause the processor 108 to determine hierarchy classification of each of the plurality of line regions in a document, as discussed in greater detail below. The memory 110 may be a non-volatile memory or a volatile memory. Examples of non-volatile memory may include, but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random Access Memory (DRAM), and Static Random-Access memory (SRAM).

The text identification device 104 may further determine the positional information and text-characteristic information for each of the plurality of line regions. For example, the input file may be a document which may be converted into a machine readable format such as a Portable Document Format (PDF) file. The identified text data may include a plurality of text entities. As such in some embodiments, the text identification device 104 may use one or more text extraction tools for identifying and extracting the text data from the input file. In alternate embodiments, the text identification device 104 may use any other technique known in the art for identifying the text data from the input file.

The text identification device 102 may be configured to classify the plurality of line regions identified in the input file by the text identification device 104 based on a plurality of hierarchy classifications. The plurality of hierarchy classifications may include, but is not limited to, a segregator, a header, a sub-header, and a paragraph. In some embodiments, in order to classify the plurality of line regions, the text identification device 104 may determine a plurality of features for each of the plurality of line regions. The plurality of features may include positional information and text characteristic information for each of the text entities or words in each of the plurality of line regions. The text characteristics information for each line region may include, but not limited to, extracted text data, number of words in the extracted text data, font type, font size, case information such as (small case, upper case, mixed case, camel case, etc.), a typography information such as (underline, bold, italic, etc.). The positional information of each of the plurality of line regions may include but not limited to x and y coordinates of each word, width, and the height of each word of the extracted text data. The classification device 102 may include a rule based model and a machine learning based model to determine classification of each line region. The rule based model may determine a first hierarchy classification from the plurality of hierarchical classifications based on a plurality of predefined rules. In an embodiment, the plurality of predefined rules may include a list of rules defining an applicable hierarchy classification for predefined positional information and text characteristic information. In an embodiment, a line region may be categorized as a "Paragraph" if the extracted text data are not in upper case, length of words are more than "7" and font size of the words are same as compared to each other. In an embodiment, a line region may be categorized as a "Header", if the extracted text data is in upper case, and the length of words are less than "7" and font size of the words is same as compared to each other. In another embodiment, a line region may be categorized as a "Sub-Header", if the length of words in the extracted text data is less than "7" and font size is same as compared to other, and the line region starts with pattern "2.14". In an embodiment, a line region may be categorized as a "Segregator", if the extracted text data is upper case, length of words are less than "7" and font size of the extracted text is greater than the font size of the extracted text of the consecutive line regions. In an embodiment, a line region may be categorized as a "Paragraph", if all the extracted text data is not in upper case, length of words of the extracted text data is more than "7" and font size is same as compared to font size of the extracted text of the consecutive line regions. In an embodiment, a line region may be categorized as a "Header", if the extracted text data is upper case, length of words are less than or equal to "7" and font size of the extracted text is same as the font size of the extracted text of the consecutive line regions. In an embodiment, a line region may be categorized as a "Sub-Header", if the length of words is same and font size of the extracted text is same as the font size of the extracted text of the consecutive line regions and the line regions starts with pattern "8.1". Accordingly, the plurality of predefined rules may include various other rules not limited to the rules defined above.

In another embodiment, the classification device 102 in order to classify each of the plurality of line regions based on hierarchy classification may determine a second hierarchy classification from the plurality of hierarchy classifications and a respective probability value of the second hierarchy classification based on a machine learning technique. In an embodiment, the machine learning technique may include but not limited to the different algorithm like the random forest, decision tree, etc. In an embodiment, the machine learning technique may be trained based on training data corresponding to a plurality of features of each of the plurality of hierarchy classifications. The classification device 102 may classify each of the plurality of the line regions based on the first hierarchy classification or the second hierarchy classification. In an embodiment, the classification device 102 may select second hierarchy classification for a line region in case the probability of the second hierarchy classification as determined by the ML technique is greater than or equal to a predefined threshold. In another embodiment, the classification device 102 may select first hierarchy classification for a line region in case the respective probability value of the second classification is less than the predefined threshold.

Once all the text data in the selectable document has been classified, the relevant text data corresponding to a particular classification may be easily extracted for further processing.

Figure 2:
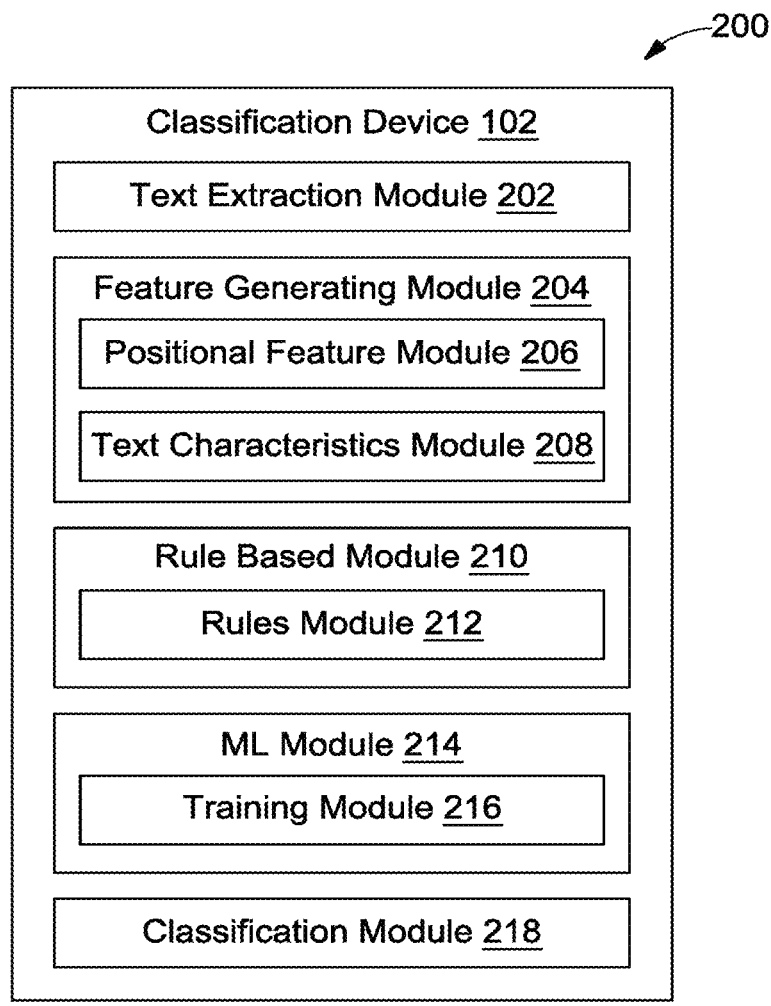
FIG. 2 is a functional block diagram of the classification device, in accordance with some embodiments of the present disclosure.

Referring now to FIG. 2, a functional block diagram of the classification device is illustrated, in accordance with some embodiments of the present disclosure. In an embodiment, the classification device 102 may include a text extraction module 202, a feature generating module 204, a rule-based module 210, an ML module 214 and a classification module 218.

The text extraction module 202 may determine a plurality of line regions in a document. Further, the text extraction module 202 may extract text data in each of the plurality of line regions using one or more text extraction tools. The feature generating module 204 may determine one or more features of the extracted text data for each of the plurality of line regions. The feature generating module 204 may further include a positional feature module 206 and a text characteristic module 208 to determine positional features and text-characteristic features respectively of the text data of each of the plurality of line regions. In an embodiment, the text characteristic module 208 may determine text characteristics information for each line region that may include, but not limited to, extracted text data, number of words in the extracted text data, font type, font size, case information such as (small case, upper case, mixed case, camel case, etc.), a typography information such as (underline, bold, italic, etc.). The positional feature module 206 may determine positional information of each of the plurality of line regions that may include but not limited to x and y coordinates of each word, width, and the height of each word of the extracted text data, etc.

The classification device 102 may further include a rule-based module 210. The rule-based module 210 may determine a first hierarchy classification from a plurality of hierarchy classifications based on a plurality of predefined rules. The plurality of predefined rules defines standard positional information and standard text-characteristic information for each of the plurality of hierarchy classifications and for each of a plurality of predefined document templates.

In an exemplary embodiment, the plurality of predefined rules may include a list of rules defining an applicable hierarchy classification for predefined or standard positional information and predefined or standard text characteristic information. In an embodiment, a line region may be categorized as a "Paragraph" if the extracted text data are not in upper case, length of words are more than "7" and font size of the words are same as compared to each other. In an embodiment, a line region may be categorized as a "Header", if the extracted text data is in upper case, and the length of words are less than "7" and font size of the words is same as compared to each other. In another embodiment, a line region may be categorized as a "Sub-Header", if the length of words in the extracted text data is less than "7" and font size is same as compared to other, and the line region starts with pattern "2.14". In an embodiment, a line region may be categorized as a "Segregator", if the extracted text data is upper case, length of words are less than "7" and font size of the extracted text is greater than the font size of the extracted text of the consecutive line regions. In an embodiment, a line region may be categorized as a "Paragraph", if all the extracted text data is not in upper case, length of words of the extracted text data is more than "7" and font size is same as compared to font size of the extracted text of the consecutive line regions. In an embodiment, a line region may be categorized as a "Header", if the extracted text data is upper case, length of words are less than or equal to "7" and font size of the extracted text is same as the font size of the extracted text of the consecutive line regions. In an embodiment, a line region may be categorized as a "Sub-Header", if the length of words is same and font size of the extracted text is same as the font size of the extracted text of the consecutive line regions and the line regions starts with pattern "8.1". Accordingly, for a person skilled in the art, it may be understood that the plurality of predefined rules may include various other rules not limited to the rules defined above.

FIG. 3A illustrates an exemplary input document 300A for classification of text data of line regions based on hierarchy classification, in accordance with an embodiment of the present disclosure.

Figure 3B:
FIG. 3B depicts a table including various features of the input document, in accordance with an embodiment of the present disclosure.

FIG. 3B depicts a table 300B including various features of the input document, in accordance with an embodiment of the present disclosure. The row 302 depicts the list of features such as positional information text-characteristic information which have been determined for each of the line regions in the input document 300A by the feature generating module 202.

FIG. 3C depicts a table 300C including various features utilized by the rule based module 210, in accordance with an embodiment of the present disclosure. In an embodiment, table 300C depicts columns 304 which may be used as features for determining a hierarchy classification of the line regions based on the predefined rules of the rules module 212. The column 306 depicts the hierarchy classification determined as an output of the rule based module 210 for each line region based on the predefined rules of the rules module 212. In an embodiment, the rules module 210 may determine features in addition to features depicted in 304 in order to determine the hierarchy classification of the line regions based on the predefined rules. In an embodiment, the rules module 212 may define the features based on which the hierarchy classification of each line region may be determined by the rules based module 210.

Figure 3D:
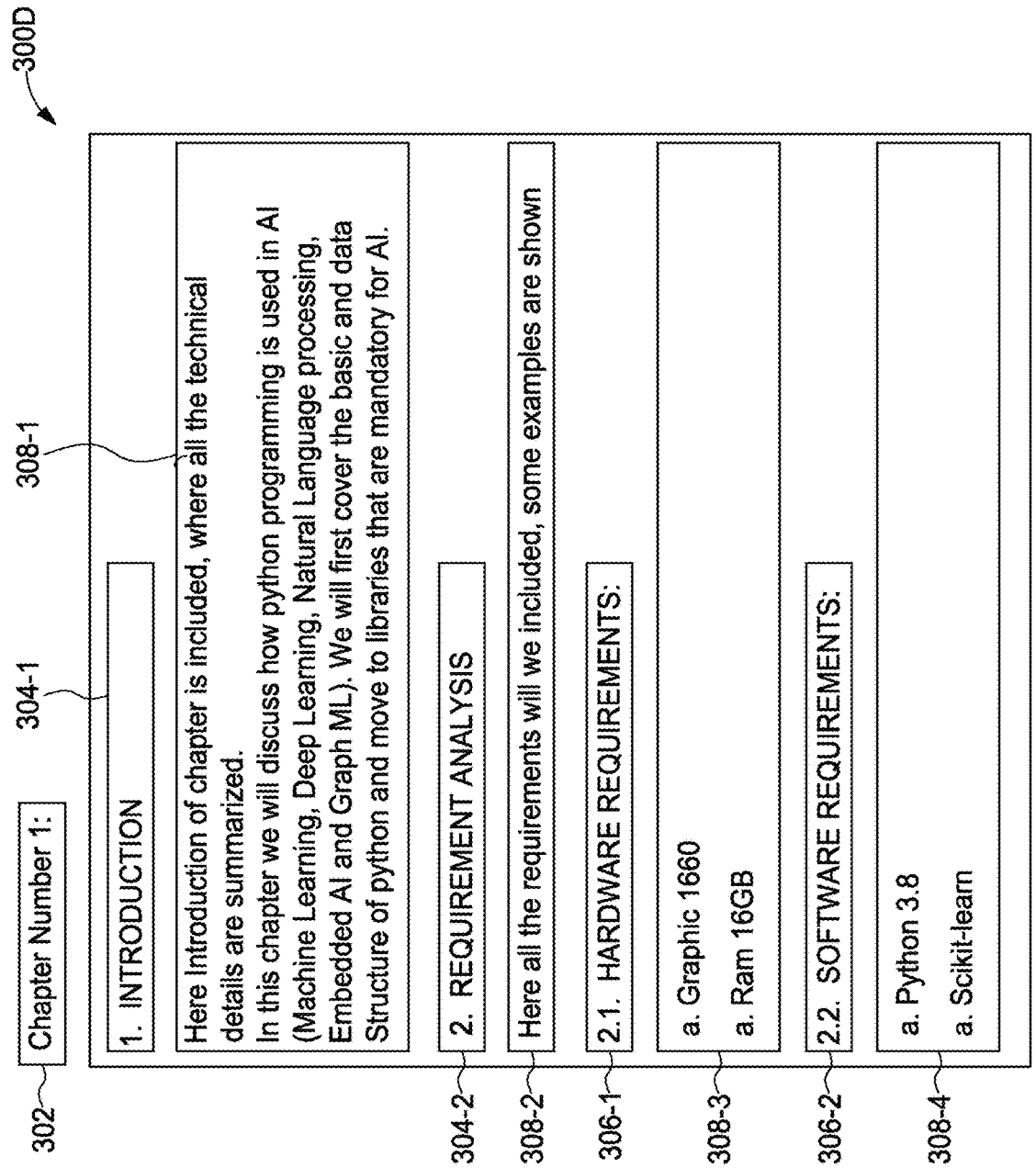
FIG. 3D depicts a snapshot of an exemplary input file as training data with line regions classified based on a plurality of hierarchy information, in accordance with some embodiments of the present disclosure.

The classification device 102 may further include a Machine Learning (ML) module 214. The ML module 214 may determine a second hierarchy classification from the plurality of hierarchy classifications for each of the line regions. The ML module 214 may be include a training module 216 which may train the ML module 214 based on training data corresponding to a plurality of features of each of the plurality of hierarchy classifications. The training data may include a plurality of features of text data extracted using text extraction tool for a plurality of line regions in training data corresponding to each of the plurality of hierarchy classifications. The machine learning technique may include but not limited to the random forest, decision trees, etc. Referring now to FIG. 3D, a snapshot of an exemplary input file 300D as training data with line regions classified based on a plurality of hierarchy information is illustrated, in accordance with some embodiments of the present disclosure. In an embodiment, the exemplary input document 300D shows a plurality of line regions with text data classified based on hierarchy classifications such as, but not limited to, segregator, header, sub-header, paragraph, etc. In the document 300A, the line region 302 is classified as "segregator". The line regions 304-1 and 304-2 are classified as "headers". The line regions 306-1 and 306-2 have been classified as "sub-headers". Further, the line regions 308-1, 308-2, 308-3 and 308-4 have been classified as "paragraphs".

The training module 216 may determine one or more features such as positional information and text characteristic information of the training data for each of the plurality of hierarchy classifications. Further, the training module 216 may train the ML model 218 using balanced datasets for each of the plurality of hierarchy classification. The training dataset corresponding to each of the plurality of hierarchy classification may be re-sampled in order to create the balanced training dataset.

FIG. 3E depicts a table 300E including various features utilized by the ML based module 214, in accordance with an embodiment of the present disclosure. In an embodiment, table 300E depicts columns 308 which may be used as features for determining a hierarchy classification of the line regions by the ML module 214. The column 310 depicts the predicted hierarchy value or a second hierarchy classification determined as an output of the ML module 214 for each line region. The column 312 depicts the probability value of the second hierarchy classification determined as an output of the ML module 214 for each line region. In an embodiment, the ML module 214 may be trained by the training module 216 to determine hierarchy classification based on features 308 of the line regions. In an embodiment, the training module 216 may train the ML module 214 based on features other than the features 308.

The ML module 214 may then determine a respective probability value of hierarchy classification for each of the plurality of line regions based on the trained machine learning technique.

Figure 3F:
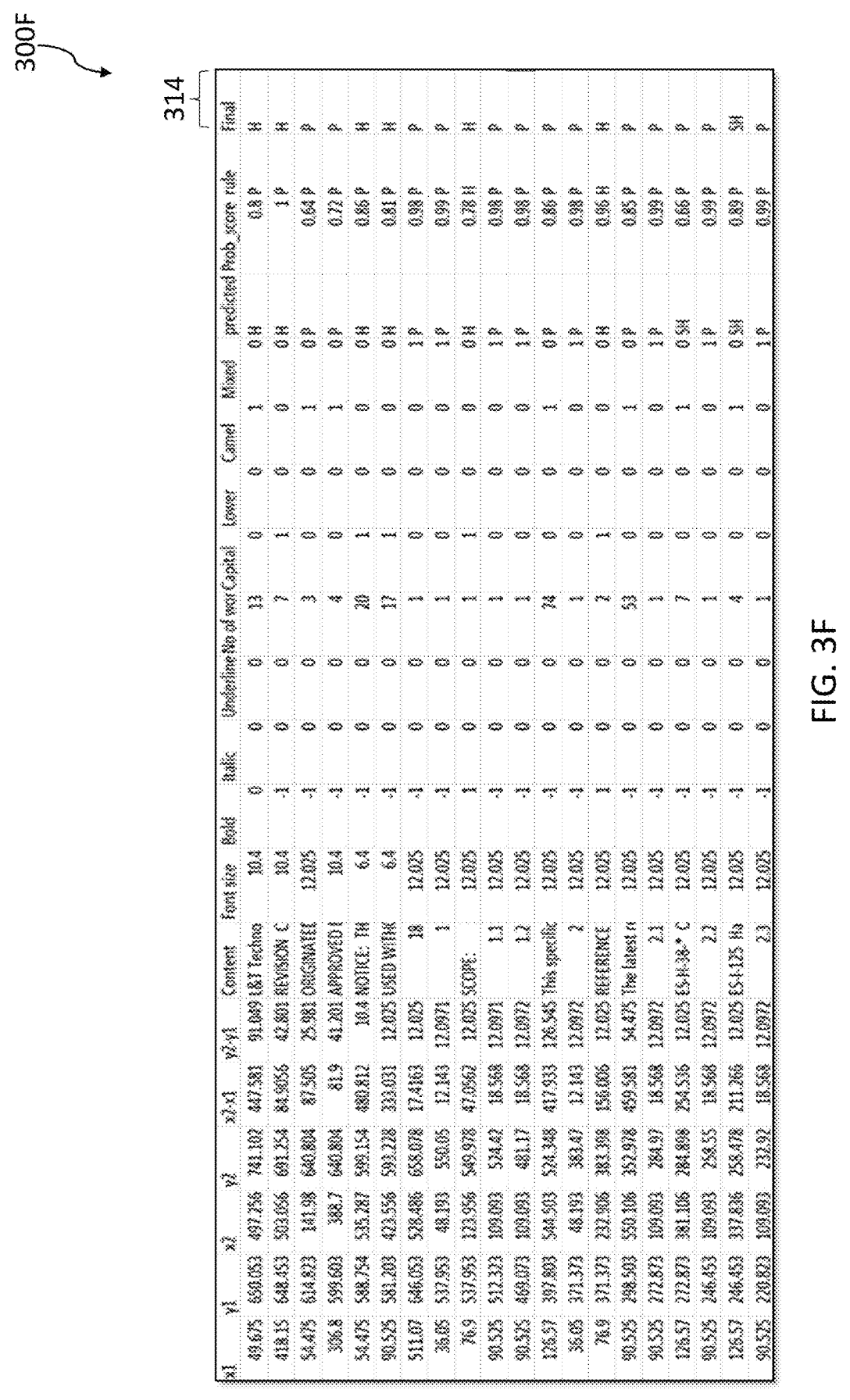

The classification module 218 may classify each of the plurality of line regions based on the first hierarchy classification or the second hierarchy classification. The second hierarchy classification may be selected in case the respective probability value of the second classification is greater than or equal to a predefined threshold. The classification module 218 may classify the line region based the first hierarchy classification in case the respective probability value of the second classification is less than the predefined threshold. In an embodiment, the predefined threshold value may be "0.9" and may be determined based on experimental results. FIG. 3F depicts a table 300F depicting final hierarchy classification of each line region, in accordance with an embodiment of the present disclosure. The column 314 depicts the final hierarchy classification for each line region based on the first hierarchy classification and the second hierarchy classification.

Figure 4:
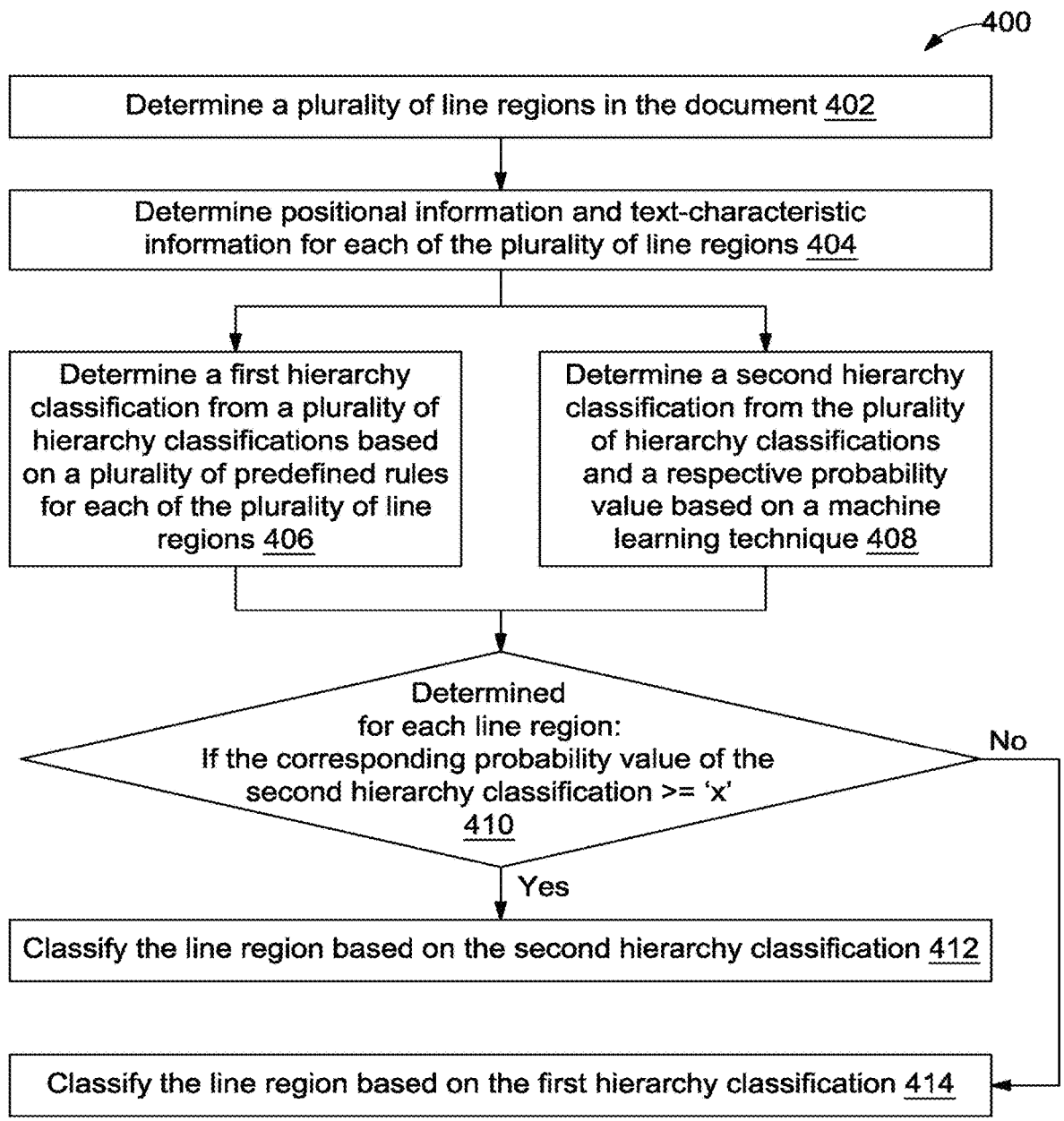
FIG. 4 is a flowchart of a method of classifying text data based on hierarchy information, in accordance with some embodiments of the present disclosure.

Referring now to FIG. 4, a flowchart of a method of classifying text data in a document, in accordance with some embodiments of the present disclosure. In an embodiment, the method 400 may include a plurality of steps which may be performed by the processor 108 to classify text data in a document.

At step 402, the processor 108 may determine a plurality of line regions in the document. In an embodiment, the plurality of line regions may include text data. In an embodiment, the input file may include files in various format, but may not limited to, Portable Document Format (PDF) files, etc. Further at step 404, positional information and text-characteristic information for each of the plurality of line regions may be determined. In an embodiment, the positional information and text-characteristic information which may be determined by using text extraction tools.

At step 406, the processor may determine a first hierarchy classification from a plurality of hierarchy classifications based on a plurality of predefined rules for each of the plurality of line regions.

At step 408, the processor may determine a second hierarchy classification from the plurality of hierarchy classifications and a respective probability value based on a machine learning technique. In an embodiment, the machine learning technique may be trained based on a training data corresponding to a plurality of features of each of the plurality of hierarchy classifications.

At step 410, the processor may determine if the corresponding probability value of the second hierarchy classification is greater than the threshold value of 'x'. In an embodiment, the threshold value 'x' may be equal to '0.9' and may be determined based on experimental data.

At step 412, the processor may classify the line region based on the second hierarchy classification in case the corresponding probability value of the second hierarchy classification is greater than or equal to the threshold value of 'x'.

At step 414, the processor may classify the line region based on the first hierarchy classification in case the corresponding probability value of the second hierarchy classification is determined to be less than the threshold value of 'x'.

It is intended that the disclosure and examples be considered as exemplary only, with a true scope of disclosed embodiments being indicated by the following claims.

What is claimed is:

1. A method of classifying text data in a document, the method comprising:
   determining, by a processor, a plurality of line regions in the document, wherein each of the plurality of line regions comprises text data;
   determining, by the processor, positional information, and text-characteristic information for each of the plurality of line regions;
   for each of the plurality of line regions:
      determining, by the processor, a first hierarchy classification from a plurality of hierarchy classifications based on a plurality of predefined rules;
      determining, by the processor, a second hierarchy classification from the plurality of hierarchy classifications and a respective probability value based on a machine learning technique, wherein the machine learning technique is trained based on a training data corresponding to a plurality of features of each of the plurality of hierarchy classifications; and
   classifying, by the processor, each of the plurality of line regions based on the first hierarchy classification or the second hierarchy classification, wherein the second hierarchy classification is selected in case the respective probability value of the second hierarchy classification is greater than or equal to a predefined threshold, and wherein the first hierarchy classification is selected in case the respective probability value of the second hierarchy classification is less than the predefined threshold.

2. The method of claim 1, wherein the plurality of hierarchy classifications comprises a segregator, a header, a sub-header, and a paragraph.

3. The method of claim 1, wherein the text-characteristic information for each of the plurality of line regions comprises extracted text data, a number of words in the extracted text data, and font information of the extracted text data, wherein the font information of the extracted text data comprises font type, font size, case information, and typography information, wherein the positional information comprises x and y coordinates, a width, and a height of each word of the extracted text data of each of the plurality of line regions, and wherein the text data is extracted using an extraction tool.

4. The method of claim 1, wherein the machine learning technique determines the second hierarchy classification based on a plurality of features of text data extracted using an extraction tool for each of the plurality of line regions, wherein the plurality of features comprises positional information of the text data, a number of words in the text data, and font information of the text data, wherein the font information comprises a font size, a font case and a font typographical information.

5. The method of claim 1, wherein the plurality of predefined rules defines standard positional information and standard text-characteristic information for each of the plurality of hierarchy classifications and for each of a plurality of predefined document templates.

6. The method of claim 5, wherein the standard positional information comprises x and y coordinates, a width, and a height of each standard text data corresponding to each of the plurality of hierarchy classifications.

7. The method of claim 5, wherein the standard text-characteristic information comprises a number of words, a font type, a font size, case information, and typography information of each standard text corresponding to each of the plurality of hierarchy classifications and for each of the plurality of predefined document templates.

8. A system for classifying text data in a document, the system comprising:
   a processor; and
   a memory communicatively coupled to the processor, wherein the memory stores processor-executable instructions, which, on execution by the processor, cause the processor to:
   determine a plurality of line regions in the document, wherein each of the plurality of line regions comprises text data;
   determine a positional information and text-characteristic information for each of the plurality of line regions;
   for each of the plurality of line regions:
      determine a first hierarchy classification from a plurality of hierarchy classifications based on a plurality of predefined rules;
      determine a second hierarchy classification from the plurality of hierarchy classifications and a respective probability value based on a machine learning technique, wherein the machine learning technique is trained based on a training data corresponding to a plurality of features of each of the plurality of hierarchy classifications; and
   classify each of the plurality of line regions based on the first hierarchy classification or the second hierarchy classification,
      wherein the second hierarchy classification is selected in case the respective probability value of the second hierarchy classification is greater than or equal to a predefined threshold, and
      wherein the first hierarchy classification is selected in case the respective probability value of the second hierarchy classification is less than the predefined threshold.

9. The system of claim 8, wherein the text-characteristic information for each of the plurality of line regions comprises extracted text data, a number of words in the extracted text data, and font information of the extracted text data, wherein the font information of the extracted text data comprises font type, font size, case information, and typography information, wherein the positional information comprises x and y coordinates, a width, and a height of each word of the extracted text data of each of the plurality of line regions, and wherein the text data is extracted using an extraction tool.

10. The system of claim 8, wherein the machine learning technique determines the second hierarchy classification based on a plurality of features of text data extracted using an extraction toll for each of the plurality of line regions, wherein the plurality of features comprises positional information of the text data, a number of words in the text data, and font information of the text data, wherein the font information comprises a font size, a font case and a font typographical information.

11. The system of claim 8, wherein the plurality of predefined rules defines standard positional information and standard text-characteristic information for each of the plurality of hierarchy classifications and for each of a plurality of predefined document templates.

12. The system of claim 11, wherein the standard positional information comprises x and y coordinates, a width, and a height of each standard text data corresponding to each of the plurality of hierarchy classifications.

13. The system of claim 11, wherein the standard text-characteristic information comprises a number of words, a font type, a font size, case information, and typography information of each standard text corresponding to each of the plurality of hierarchy classifications and for each of the plurality of predefined document templates.

14. A non-transitory computer-readable medium storing computer-executable instructions for classifying text data in a document, the computer-executable instructions configured for:

determining a plurality of line regions in the document, wherein each of the plurality of line regions comprises text data;

determining positional information, and text-characteristic information for each of the plurality of line regions;

for each of the plurality of line regions:

determining a first hierarchy classification from a plurality of hierarchy classifications based on a plurality of predefined rules;

determining a second hierarchy classification from the plurality of hierarchy classifications and a respective probability value based on a machine learning technique, wherein the machine learning technique is trained based on a training data corresponding to a plurality of features of each of the plurality of hierarchy classifications; and classifying each of the plurality of line regions based on the first hierarchy classification or the second hierarchy classification, wherein the second hierarchy classification is selected in case the respective probability value of the second hierarchy classification is greater than or equal to a predefined threshold, and wherein the first hierarchy classification is selected in case the respective probability value of the second hierarchy classification is less than the predefined threshold.

15. The non-transitory computer-readable medium of claim 14, wherein the plurality of hierarchy classifications comprises a segregator, a header, a sub-header, and a paragraph.

16. The non-transitory computer-readable medium of claim 14, wherein the text-characteristic information for each of the plurality of line regions comprises extracted text data, a number of words in the extracted text data, and font information of the extracted text data, wherein the font information of the extracted text data comprises font type, font size, case information, and typography information, wherein the positional information comprises x and y coordinates, a width, and a height of each word of the extracted text data of each of the plurality of line regions, and wherein the text data is extracted using an extraction tool.

17. The non-transitory computer-readable medium of claim 14, wherein the machine learning technique determines the second hierarchy classification based on a plurality of features of text data extracted using an extraction tool for each of the plurality of line regions, wherein the plurality of features comprises positional information of the text data, a number of words in the text data, and font information of the text data, wherein the font information comprises a font size, a font case and a font typographical information.

18. The non-transitory computer-readable medium of claim 14, wherein the plurality of predefined rules defines standard positional information and standard text-characteristic information for each of the plurality of hierarchy classifications and for each of a plurality of predefined document templates.

19. The non-transitory computer-readable medium of claim 18, wherein the standard positional information comprises x and y coordinates, a width, and a height of each standard text data corresponding to each of the plurality of hierarchy classifications.

20. The non-transitory computer-readable medium of claim 18, wherein the standard text-characteristic information comprises a number of words, a font type, a font size, case information, and typography information of each standard text corresponding to each of the plurality of hierarchy classifications and for each of the plurality of predefined document templates.

* * * * *